Figure 1:
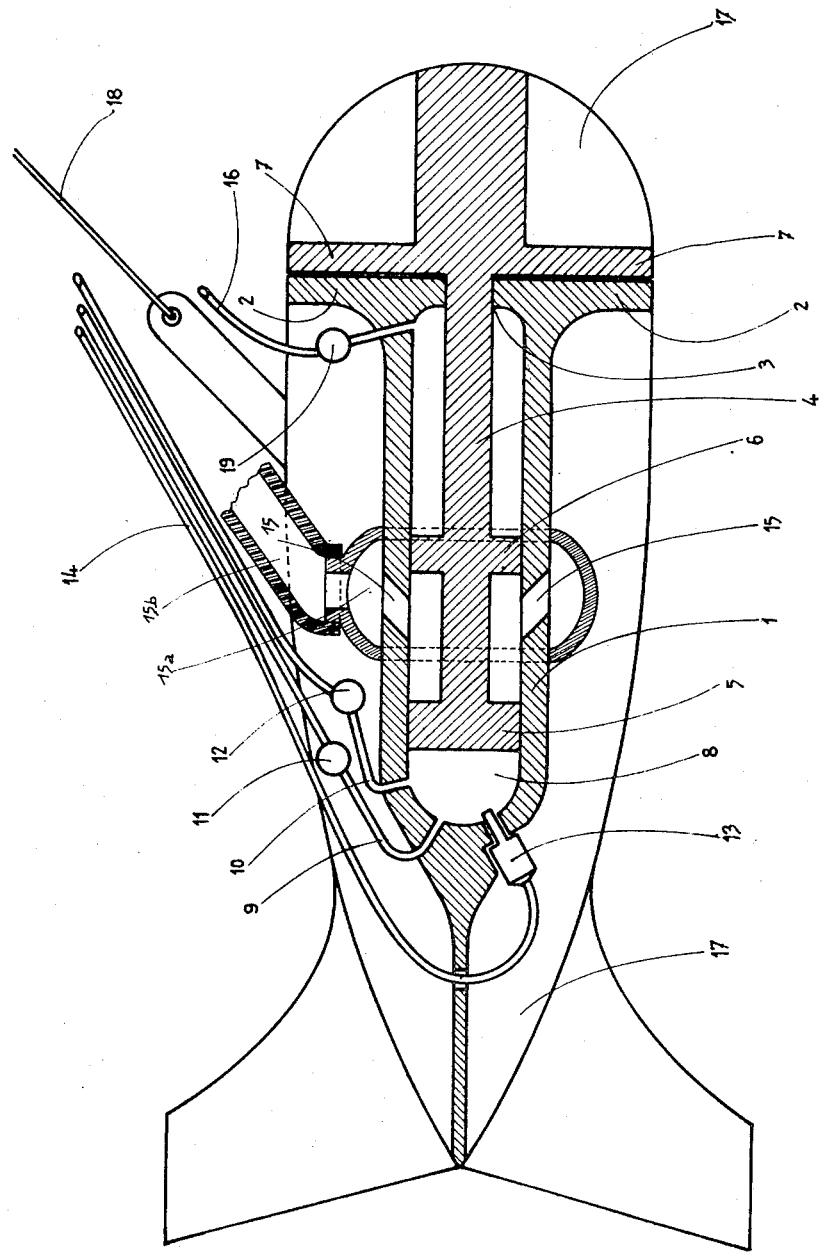

United States Patent

[11] 3,545,563

| [72] | Inventor | Jacques Cholet |
| | | Rueil Malmaison, France |
| [21] | Appl. No. | 790,966 |
| [22] | Filed | Jan. 14, 1969 |
| [45] | Patented | Dec. 8, 1970 |
| [73] | Assignee | Institut Francais du Petrole, Des Carburants et Lubrifiants |
| | | (Hauts de Seine), France |
| [32] | Priority | Jan. 18, 1968 |
| [33] | | France |
| [31] | | No. 136.593 |

[54] DEVICE FOR EMITTING ACOUSTIC WAVES IN WATER
3 Claims, 2 Drawing Figs.

[52] U.S. Cl. .................................................... 181/0.5;
340/7
[51] Int. Cl. ...................................... G01v 1/04,
G01v 1/38
[50] Field of Search .......................................... 181/0.5
(C2, C3, C4); 340/(T)

[56]        References Cited
        UNITED STATES PATENTS
3,215,223  11/1965  Kirby et al. ................... 181/0.5
3,369,627  2/1968  Schempf ..................... 181/0.5

*Primary Examiner*—Rodney D. Bennett, Jr.
*Assistant Examiner*—Daniel C. Kaufman
*Attorney*—Craig, Antonelli, Stewart & Hill ABSTRACT: Method and apparatus for emitting acoustic waves in water by forcefully separating a pair of plates by means of a piston and cylinder arrangement providing a combustion chamber and a counter pressure chamber on respective sides of the piston, a pressure being provided in said counter pressure chamber to simultaneously position one plate against the other plate and compress the gases in the combustion chamber so that ignition of the compressed gas produces a separation of the plates.

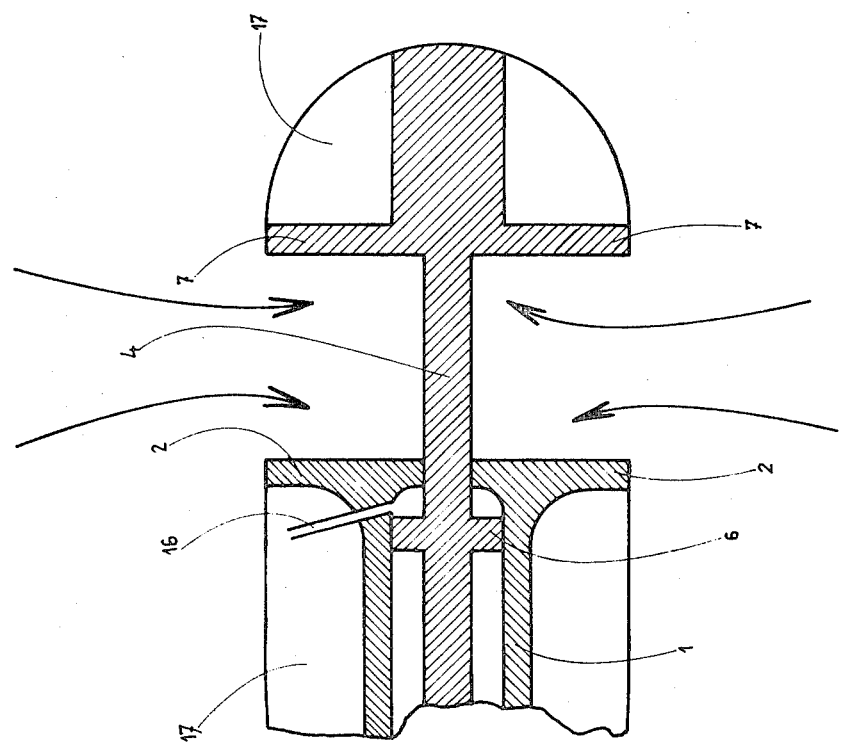

3,545,563

DEVICE FOR EMITTING ACOUSTIC WAVES IN WATER

A method commonly used in marine seismic prospecting consists of emitting acoustic waves by detonating in water, at a certain depth, one or more explosive charges and recording, by means of a series of receivers placed in water at various distances from the explosive source, the waves reflected by the different underwater strata.

Such a method requires the transportation and handling of the necessary amount of explosive material for the performance of the totality of these operations, which requires particularly safety provisions.

The present invention has for an object to provide an emitting source of acoustic waves which can be used for seismic prospecting and can be adapted to a marine vehicle.

This and other objects as will be apparent from the following specification and claims, are achieved by use of a source of acoustic waves operated by abruptly moving away from each other two plates in water.

As a matter of fact when two immersed adjacent plates are abruptly moved away from each other, a vacuum is temporarily created between those plates and water fills suddenly this vacuum space, thereby generating an acoustic wave.

The emitting device according to this invention comprises two plates, one of which is stationary and the other movable. It is mainly characterized by the fact that the abrupt moving away of the movable plate from the other is generated by the displacement of a piston integral with the movable plate, which displacement is produced by explosion of a gaseous mixture in a combustion chamber delimited by a stationary cylinder wall closed at the end thereof opposite to the movable plate and by said piston.

It is further characterized by the provision of a counterpressure chamber delimited by a stationary cylindrical wall closed at the end thereof on the side of the movable plate and by a piston integral with said movable plate, the volume of said counterpressure chamber varying in inverse proportion to the volume of the combustion chamber during the displacement of the movable plate.

The invention will be described more in detail with reference to the accompanying drawings wherein:

FIG. 1 diagrammatically represents a cross-sectional view of one embodiment of an emitting device according to the invention in a position where the plates are close to each other, and FIG. 2 diagrammatically shows a partial cross section of the device of FIG. 1 in a position where the plates are the most distant from each other.

The emitting device, as illustrated by way of example in FIG. 1, comprises a stationary part formed of a hollow cylinder 1 made of material resistant to explosions, provided at one end thereof with a plate 2 having a bore 3.

A rod 4 is slidably mounted through said bore in said cylinder. It is provided, at its end inside the cylinder, with a first piston 5 of a diameter equal, except for a slight clearance, to the inner diameter of the cylinder and, at some distance from said end, with a second piston 6 of the same diameter as the first one.

The rod 4 is also provided, at its end outside the cylinder, with a plate 7 which is in contact with plate 2 in one and position thereof.

The length of the rod 4 is such that when the plates 2 and 7 are in the contacting position the piston 5 does not reach the bottom of the cylinder, thereby providing a space 8 which is used as a combustion chamber.

The space 8 is supplied with liquid or gaseous components of an explosive mixture through channels 9 and 10 for example, respectively controlled by the injection devices 11 and 12. A sparking device 13 supplied with electric current through conductors 14 ensures the ignition of the explosive mixture in space 8.

The cylindrical wall 1 is provided with ports 15 for exhaust gases, located in the interval between pistons 5 and 6 when the plates are in their contacting position. These ports may communicate with the external medium through a free exhaust passage, for instance an annular channel 15a extended with an exhaust pipe 15b.

An inlet 16 for compressed air, controlled by means of a valve 19 is provided in cylinder 1 in the vicinity of plate 2.

The space defined by the inner wall of cylinder 1 in the vicinity of plate 2 and piston 6 is used as a counterpressure chamber.

The entire device as described may be mounted in a streamlined hull 17 facilitating its displacements when immersed. It is towed by means of a cable 18 from a mobile installation (not shown).

The operation of the device is as follows:

The movable plate 7 is applied against the stationary plate 2, while through channels 9 and 10, respectively controlled by the injection devices 11 and 12, the liquid or gaseous components of an explosive mixture are supplied to the space 8, forming a combustion chamber. This explosive mixture is ignited by means of the spark plug 13 connected through conductor 14 to a source of electric current. The mixture then explodes in the combustion chamber, thereby violently repelling piston 5 which slides in cylinder 1 until the piston 6 comes in position of abutment against the bottom of the cylinder close to the plate 2.

The piston 5 moves the plate 7 away from plate 2 through the intermediary of the rod 4. For a moment a vacuum is created between the two plates and water, by abruptly filling this vacuum space, generates an acoustic wave.

The piston 5, while being displaced toward plate 2, uncovers ports 15. The combustion gases escape through channel 15a and pipe 15b to the surrounding medium.

When it is desired to bring again the mobile plate 7 in a closer position with respect to the stationary plate 2 with a view toward performing a new cycle, there is introduced compressed air into the cylinder through channel 16 close to plate 2 so as to exert a force on piston 6. This air must be compressed at a pressure substantially higher than the hydrostatic pressure and also higher than the pressure at which are injected the components of the explosive mixture, so as to maintain the plate 7 pressed against plate 2 during the injection of said components in the combustion chamber.

In this way, at the end of the injection, the feeding gases in the combustion chamber may be at a substantially high pressure before the ignition of the gaseous mixture, whereby the energetic yield of the device is significantly increased a far sharper pressure increase in the combustion chamber at the moment of ignition is achieved.

The device used for ensuring the motion of the movable plate also offers the advantages of being simple and economical.

It must be understood that the invention is by no way limited to the peculiar embodiments hereabove illustrated since various changes and modifications can be made to adapt it to various usages and conditions without departing from the spirit and scope of the invention. In particular the exhaust pipe 15b can be provided with a valve preventing water from penetrating into said pipe while ensuring the exhaust of the gases at a pressure higher than the hydrostatic pressure. The air or carburant supply to the combustion chamber may also be so arranged as to provide for an efficient scavenging of the burned gases.

I claim:

1. A device for emitting acoustic waves in water by abruptly and forcefully separating a movable plate from a stationary plate preliminarily positioned thereagainst to produce a cavity in a body of water, comprising:

a closed cylinder and a movable piston in said cylinder defining a combustion chamber on one side and a counter pressure chamber on the other side thereof, said stationary plate being provided on one end of said cylinder and said piston being connected through said stationary plate to said movable plate;

means injecting a combustible gaseous mixture into said combustion chamber at a higher pressure than the hydrostatic pressure exerted by the ambient water on the movable plate;

means introducing into said counterpressure chamber a gas at a pressure higher than the difference between the pressure of said gaseous mixture introduced in said combustion chamber and the hydrostatic pressure exerted on the movable plate by the ambient water, so as to compress said combustible gaseous mixture as well as return said piston to a firing position; and means for igniting the gaseous mixture in said combustion chamber.

2. A device according to claim 1, wherein said piston is connected to said movable plate by way of a connecting rod passing through said stationary plate, and further including an additional piston secured to said connecting rod in spaced relationship with the other piston on the counter pressure side thereof, and venting means in said cylinder between said pistons with said plates contacting each other for venting the combustion gases burned in said combustion chamber.

3. A method for abruptly and forcefully separating a movable plate from a stationary plate preliminarily positioned in proximate relationship to produce a cavity in a body of water, said stationary plate being secured to a cylinder in which is provided a piston connected to said movable plate, the steps comprising:

introducing into said cylinder on one side of said piston a gaseous combustible mixture at a higher pressure than the hydrostatic pressure of the surrounding body of water;

introducing into said cylinder on the other side of said piston gas at a pressure higher than the pressure of said gaseous combustible mixture and the hydrostatic pressure exerted on the movable plate by the ambient water so as to move said movable plate toward said stationary plate and cause compression of the combustible mixture by the piston; and igniting said combustible mixture so as to drive said piston in said cylinder and forcefully separate said plates.